United States Patent
Raghav et al.

(10) Patent No.: US 9,031,208 B2
(45) Date of Patent: May 12, 2015

(54) AUGMENTING A CALL WITH CONTEXT

(71) Applicant: Microsoft Corporation, Redmond, WA (US)

(72) Inventors: Amritansh Raghav, Seattle, WA (US); Eran Shtiegman, Redmond, WA (US); Gurdeep S. Pall, Medina, WA (US); Paul D. Tidwell, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/675,861

(22) Filed: Nov. 13, 2012

(65) Prior Publication Data

US 2013/0070914 A1      Mar. 21, 2013

Related U.S. Application Data

(63) Continuation of application No. 12/580,222, filed on Oct. 15, 2009, now Pat. No. 8,311,191, which is a continuation of application No. 11/190,489, filed on Jul. 26, 2005, now Pat. No. 7,623,643.

(51) Int. Cl.
| | |
|---|---|
| H04M 1/64 | (2006.01) |
| H04M 3/436 | (2006.01) |
| H04M 1/57 | (2006.01) |
| H04M 1/725 | (2006.01) |
| H04M 7/00 | (2006.01) |

(52) U.S. Cl.
CPC ............ *H04M 3/4365* (2013.01); *H04M 1/575* (2013.01); *H04M 1/72552* (2013.01); *H04M 7/0054* (2013.01)

(58) Field of Classification Search
CPC ............................ H04M 3/533; H04M 1/6505
USPC .................... 379/88.11, 88.22, 88.23
See application file for complete search history.

(56) References Cited

U.S. PATENT DOCUMENTS

| | | | |
|---|---|---|---|
| 5,625,678 A * | 4/1997 | Blomfield-Brown | ...... 379/93.08 |
| 6,353,398 B1 | 3/2002 | Amin et al. | |
| 6,400,808 B1 | 6/2002 | Burg | |
| 6,611,532 B1 | 8/2003 | Madour et al. | |
| 6,672,506 B2 | 1/2004 | Swartz et al. | |

(Continued)

FOREIGN PATENT DOCUMENTS

| | | |
|---|---|---|
| EP | 0924917 A2 | 6/1999 |
| JP | 2000-036871 A | 2/2000 |

(Continued)

OTHER PUBLICATIONS

U.S. Appl. No. 11/470,827, filed Sep. 7, 2006, Apreutesei.

(Continued)

*Primary Examiner* — Simon King
(74) *Attorney, Agent, or Firm* — Andrew Smith; Jim Ross; Micky Minhas

(57) ABSTRACT

A method and system for providing context of a caller to a callee when a call is initiated is provided. The context system executing on the calling device collects context for the call. The calling device initiates the call and sends a message to the callee that includes the context. Upon receiving the message, the callee device notifies the caller that a call has been initiated and displays the received context. The callee can decide based on the received context whether to answer the call or not answer the call.

20 Claims, 8 Drawing Sheets

(56) References Cited

U.S. PATENT DOCUMENTS

| | | |
|---|---|---|
| 6,741,188 B1 | 5/2004 | Miller et al. |
| D494,584 S | 8/2004 | Schlieffers et al. |
| 6,796,505 B2 | 9/2004 | Pellaumail et al. |
| 6,837,436 B2 | 1/2005 | Swartz et al. |
| 6,859,822 B2 | 2/2005 | Olkin |
| 6,977,993 B2 | 12/2005 | Starbuck et al. |
| 6,993,555 B2 | 1/2006 | Kay et al. |
| 7,010,501 B1 | 3/2006 | Roslak et al. |
| 7,040,541 B2 | 5/2006 | Swartz et al. |
| 7,054,617 B2 | 5/2006 | Thomsen et al. |
| 7,063,263 B2 | 6/2006 | Swartz et al. |
| 7,171,378 B2 | 1/2007 | Petrovich et al. |
| 7,195,157 B2 | 3/2007 | Swartz et al. |
| 7,385,501 B2 | 6/2008 | Miller et al. |
| 7,623,643 B2 | 11/2009 | Raghav et al. |
| 8,311,191 B2 | 11/2012 | Raghav et al. |
| 2001/0030664 A1 | 10/2001 | Shulman et al. |
| 2002/0054087 A1* | 5/2002 | Noll et al. ............... 345/744 |
| 2003/0112944 A1 | 6/2003 | Brown et al. |
| 2003/0217109 A1 | 11/2003 | Ordille et al. |
| 2004/0078432 A1 | 4/2004 | Manber et al. |
| 2004/0078448 A1 | 4/2004 | Malik et al. |
| 2004/0143632 A1 | 7/2004 | McCarty |
| 2004/0201500 A1 | 10/2004 | Miller et al. |
| 2005/0108129 A1* | 5/2005 | Seibert et al. ............ 705/35 |
| 2005/0149622 A1 | 7/2005 | Kirkland et al. |
| 2005/0223069 A1 | 10/2005 | Cooperman et al. |
| 2005/0235034 A1 | 10/2005 | Chen et al. |
| 2005/0243982 A1* | 11/2005 | Starbuck et al. ......... 379/88.23 |
| 2005/0266858 A1 | 12/2005 | Miller et al. |
| 2006/0019676 A1 | 1/2006 | Miller et al. |
| 2006/0020677 A1 | 1/2006 | von Koch |
| 2006/0029106 A1 | 2/2006 | Ott et al. |
| 2008/0045184 A1 | 2/2008 | Randall et al. |
| 2008/0090591 A1 | 4/2008 | Miller et al. |
| 2008/0091537 A1 | 4/2008 | Miller et al. |
| 2008/0161018 A1 | 7/2008 | Miller et al. |
| 2008/0165942 A1 | 7/2008 | Provenzale et al. |
| 2010/0034361 A1 | 2/2010 | Raghav et al. |

FOREIGN PATENT DOCUMENTS

| | | |
|---|---|---|
| WO | WO-0217602 A1 | 2/2002 |
| WO | WO-2004/051916 | 6/2004 |

OTHER PUBLICATIONS

Gross, Tom et al., "MatchBase: A Development Suite for Efficient Context-Aware Communication," Proceedings of the 14th Euromicro International Conference on Parallel, Distributed, and Network-Based Processing (PDP '06), 2006, 8 pages.

Hibino, Stacie and Mockus, Audris, "handiMessenger: Awareness-Enhanced Universal Communication for Mobile Users," Mobile HCI 2002, 14 pages.

Japanese Office Action for Microsoft Japanese Patent Application No. 2008-524096, dated Aug. 9, 2011, 2 pages.

PCT International Search Report, International Application No. PCT/US06/28995, Sep. 5, 2007.

Resig, John and Teredesai, Ankur, "A Framework for Mining Instant Messaging Services," Data Mining Research Group, Proceedings of the 2004 SIAM Workshop on Link Analysis, 8 pages.

Roach, A. B., "Session Initiation Protocol (SIP)—Specific Event Notification," Network Working Group, RFC 3265, Jun. 2002 (38 pages).

Rosenberg, J., et al., "SIP: Session Initiation Protocol," Network Working Group, RFC 3261, Jun. 2002 (269 pages).

Supplementary European Search Report; Application No. EP06788532, Filed on Jul. 25, 2006; Applicant: Microsoft Corporation; Mailed on May 4, 2009, 6 pages.

"Office Action received for European Patent Application No. 06788532.7," Mailed Date: Aug. 25, 2014, 5 Pages.

* cited by examiner

AUGMENTING A CALL WITH CONTEXT

CROSS REFERENCE TO RELATED APPLICATION

This application is a continuation application of U.S. patent application Ser. No. 12/580,222, filed on Oct. 15, 2009 and entitled "AUGMENTING A CALL WITH CONTEXT," issued as U.S. Pat. No. 8,311,191, which is a continuation application of U.S. patent application Ser. No. 11/190,489, filed on Jul. 26, 2005 and entitled "AUGMENTING A CALL WITH CONTEXT," issued as U.S. Pat. No. 7,623,643, which are incorporated herein in their entirety by reference.

BACKGROUND

Real-time conversations between conversation participants via their computing devices are becoming increasingly common. Such real-time conversations require that the participants be present at their computer devices (e.g., personal digital assistants) and able to respond when a communication is received. Common forms of real-time conversation are provided by instant messaging services, telephone systems, conferencing systems, and so on. An instant messaging service allows participants to send messages and have them received within a second or two by the other participants in the conversation. The receiving participants can then send responsive messages to the other participants in a similar manner. To be effective, a real-time conversation relies on the participants becoming aware of, reviewing, and responding to received messages very quickly. This quick response is in contrast to conventional electronic mail systems in which the recipients of electronic mail messages respond to messages at their convenience.

Instant messaging services require a networking protocol to establish and manage communications between participants. These services may use various mechanisms to establish sessions, such as a "session initiation protocol" ("SIP"). SIP is an application-layer control protocol that computer systems can use to discover one another and to establish, modify, and terminate sessions. SIP is an Internet proposed standard. Its specification, "RFC 3261," is available at <http://www.ietf.org/rfc/rfc3261.txt>. A specification for extensions to SIP relating to event notifications, "RFC 3265," is available at <http://www.ietf.org/rfc/rfc3265.txt>. Both of these specifications are incorporated herein in their entirety by reference.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client ("UAC"), which is a device that initiates SIP requests, or a user agent server ("UAS"), which is a device that receives SIP requests and responds to such requests. As examples, "IP-telephones," personal digital assistants, and any other type of computing device may be user agents. A device can be a UAC in one dialog and a UAS in another, or may change roles during the dialog. A proxy server is an entity that acts as a server to clients and a client to servers. In so doing, proxy servers intercept, interpret, or forward messages between UACs and UASs. A redirect server accepts a SIP request and generates a response directing the UAC that sent the request to contact an alternate network resource. A registrar is a server that accepts registration information from user agents and informs a location service of the received registration information.

SIP supports two message types: requests, which are sent from a UAC to a UAS, and responses, which are sent from a UAS to a UAC when responding to a request. A SIP message is composed of three parts. The first part of a SIP message is a "request line," which includes fields to indicate a message method (e.g., INVITE) and a request URI that identifies the user or service to which the request is being directed. The second part of a SIP message comprises headers whose values are represented as name-value pairs. The third part of a SIP message is the message's body, which is used to describe the session to be initiated or contain data that relates to the session. Message bodies may appear in requests or responses.

A Voice over Internet Protocol ("VoIP") telephone call can be initiated by a caller's device sending a SIP INVITE request identifying the telephone number of the callee to be called. When the callee's device receives the invitation, it can notify the callee of the invitation and send a SIP SESSION-In-PROGRESS message to the caller. When the callee answers, the callee's device responds to the INVITE request with a SIP 200 OK message. The conversation between the caller and callee can then be transmitted in packets using the Real-Time Protocol ("RIP"). When the caller hangs up, the caller's device sends a SIP BYE request to the callee to terminate the call.

Traditional telephone systems provide no information about a call until the call is answered. When the call is answered, the caller and callee typically exchange names to identify themselves. Caller identification systems have been used to provide a callee with some information about the call before it is answered. When a call is received, the phone number of the originating telephone may be provided. A telephone that supports caller ID can display a telephone number or a name that telephone number maps to the callee during ring back. The callee can then decide whether to answer the phone based on the caller ID information. Unfortunately, a callee may not be able to make an informed decision relating to an incoming telephone call simply based on caller ID information.

Some telephone systems, such as call-center telephone systems, may use the caller ID information to retrieve additional information about the caller. For example, the telephone system may access a customer database and retrieve the current account status of the caller. When a customer service representative at the call center answers the telephone call, the current account information can be displayed to enable the representative to assist the caller. Unfortunately, a call center telephone system may not be able to know the true reason for the call and the representative may not be able to retrieve the precise information that would be needed to assist the caller until the conversation is underway.

SUMMARY

A method and system for providing context of a caller to a callee when a call is initiated is provided. The context system executing on the calling device collects context for the call. The calling device initiates the call and sends a message to the callee that includes the context. Upon receiving the message, the callee device notifies the callee that a call has been initiated and displays the received context. The callee can decide based on the received context whether to answer the call, not answer the call, forward the call to a voice mail system, forward the call to an assistant, and so on. When the call is answered, the context may be available to the callee during the course of the conversation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
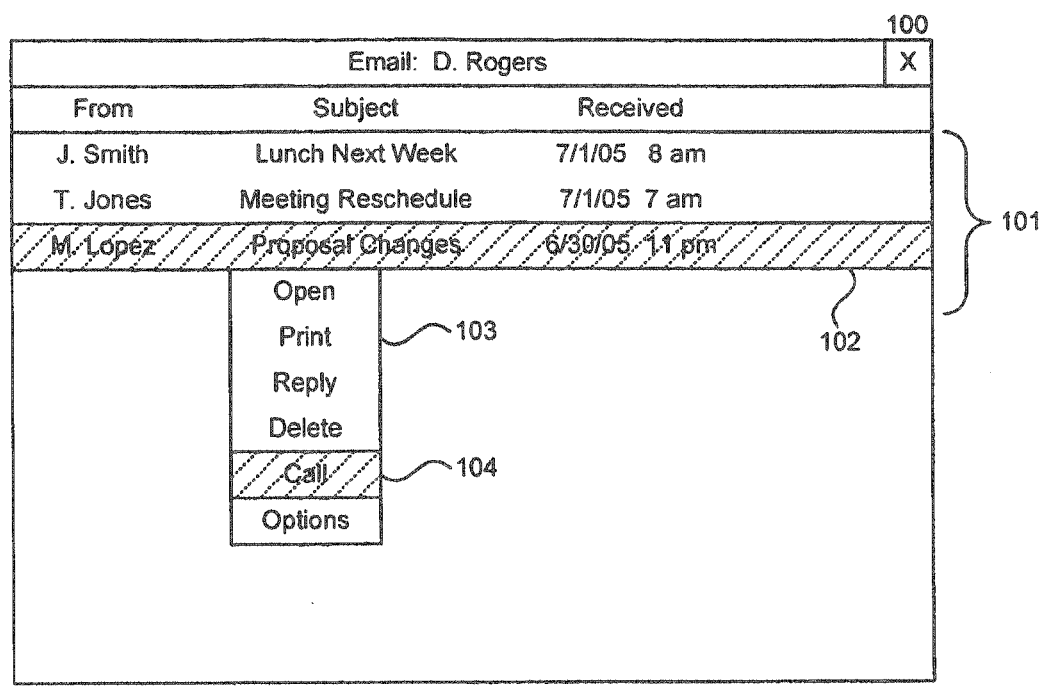
FIG. 1 is a display page that illustrates a caller placing a call in the context of an electronic mail program in one embodiment.

A method and system for providing context of a caller to a callee when a call is initiated is provided. In one embodiment, the context system executing on the calling device collects context for the call. For example, when a caller indicates that a call is to be placed to a callee, the context system may prompt the caller to input the context of the telephone call such as the subject to be discussed during the call. Alternatively, the context system may automatically identify the context based on the current state of an application executing on the calling device. For example, the caller may select an electronic mail message using an electronic mail program and request that a call be placed to the sender of that message. In such a case, the context system may use the subject of the electronic mail message as context for the call and may use the body of the message as additional context for the call. The context is information in addition to caller identification information (e.g., caller ID telephone number). The calling device may initiate the call by sending an initiation message (e.g., a SIP INVITE request) that includes the context to the callee device. Upon receiving the initiation message, the callee device notifies the callee that a call has been initiated and displays the received context. The callee can decide based on the received context whether to answer the call, not answer the call, forward the call to a voice mail system, forward the call to an assistant, and so on. When the call is answered, the context may be still available to the callee during the course of the conversation. For example, the caller may direct the callee to a certain portion of the context for further discussion. In this way, the context system provides context to a callee to assist the callee in deciding how to handle a call and when a call is answered, assist the callee during the course of the conversation.

In one embodiment, the context system may allow the caller to specify delivery options for the call. The delivery options may include the urgency of the call (e.g., low, medium, and high), the importance of the call, the sensitivity of the call (e.g., normal, confidential, and highly confidential), and the privacy of the call (e.g., encryption required, digital signature required). In addition, digital rights management for controlling the call and its associated context may be associated with a call. For example, the digital rights may restrict to whom the call and its context may be forwarded. The context system may allow a user to define rules specifying how to handle calls under various conditions such as the urgency of the call. Each rule may include a condition and an action. When the condition of the rule is satisfied, then the context system takes the associated action. For example, a condition of a rule may be that the call originates from a certain telephone number and has a high urgency. The associated action of the rule may be to forward the call to the callee's assistant if the call is not answered by the third ring. As another example, the rule may specify that all calls of low urgency are to be sent to a voice mail system. The context system may apply rules in priority order until a condition of a rule is satisfied and then stop applying rules. Alternatively, the context system may apply all the rules and perform the action of each rule whose condition is satisfied. In this way, a callee can make decisions either manually or automatically on how to handle incoming calls.

In one embodiment, the context system may automatically collect the context for a call based on the current state of applications executing on the calling device. For example, a browser and a word processing program may be currently executing on the calling device when a caller indicates to place a call to a callee. In such case, the context system may automatically include in the context the document that currently has the focus of the word processing program. The context system may also automatically include in the context a link to the web page currently being displayed by the browser. The context system may provide the caller with the option of reviewing and modifying the context before initiating the call. For example, the context system might automatically include in the context sensitive information that the caller would not want to send to the callee. In such a case, the callee would remove that sensitive information from the context before allowing the call to be initiated.

In one embodiment, the context system uses the SIP protocol to initiate a call between a caller and a callee. The context system may define SIP extensions for passing the context. When a SIP INVITE request is sent to a callee, it may include an indication that the invitation supports the SIP context extension. If the calling device also supports the context extension, then the callee device can accept the invitation and display the context to the callee. If the callee device does not support context, the callee device can decline the invitation or accept the invitation and ignore the context information of the request. In one embodiment, the callee device may not be able to display the context to the callee. In such a case, the callee device may be able to use a text-to-speech service to play a portion of the context to the callee. When a call is archived or forwarded to a voice mail system, the context system stores the context along with the voice mail. When the callee retrieves the voice mail, the context system displays the context to the callee.

In one embodiment, the context system may allow a telephone call to be placed over the public switched telephone network ("PSTN") while the context information is transmitted out-of-band using a protocol such as SIP. When a telephone call is to be placed, the context system collects the context for the telephone call. When the call is placed, the context system sends a message to the callee that includes the context using an out-of-band protocol. For example, the message may be an instant message that appears on a device of the callee while the telephone is ringing. The callee may assume that the call of the ringing telephone is from the caller identified by the instant message. The callee can then use the context provided in the instant message to determine how to handle the incoming call and to assist the callee after the call is answered.

FIG. 1 is a display page that illustrates a caller placing a call in the context of an electronic mail program in one embodiment. Display page 100 includes a listing 101 of electronic mail messages. In this example, the caller has selected the electronic mail message 102 sent from M. Lopez with the subject of Proposal Changes and received on Jun. 30, 2005 at 11 p.m. The caller then selected a right mouse button to display menu 103. The menu lists various actions that can be taken on the selected electronic mail message. In this example, the caller selects the call action 104 to indicate that the caller wants to place a call, in this example a telephone call, to the sender of the electronic mail message.

Figure 2:
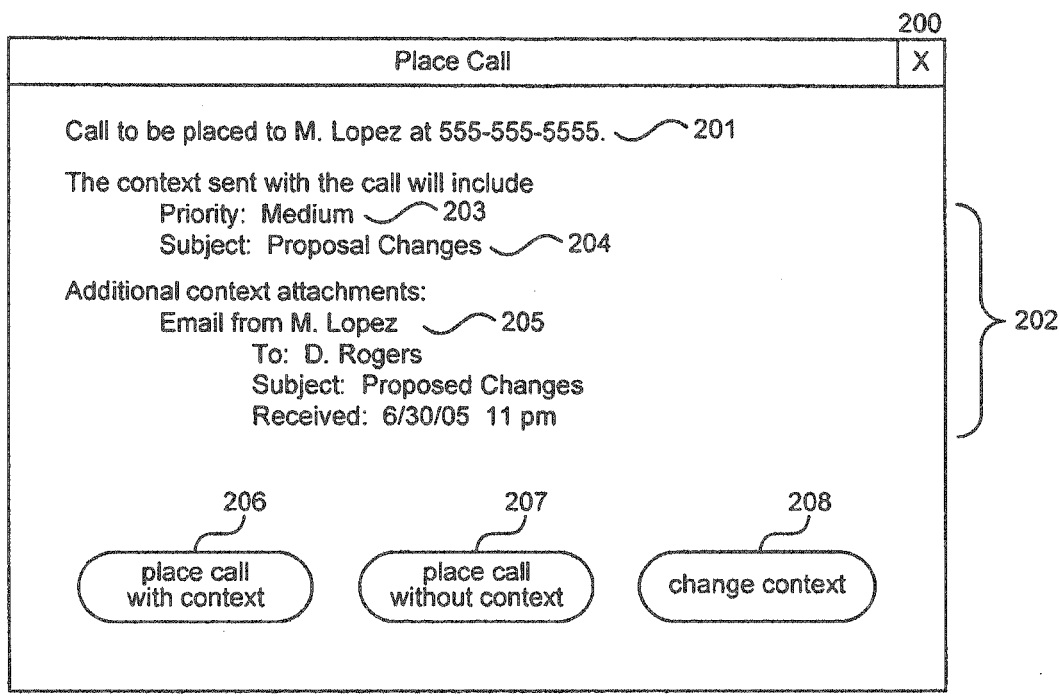
FIG. 2 is a display page that illustrates context collected by the context system before the call is placed in one embodiment.

FIG. 2 is a display page that illustrates context collected by the context system before the call is placed in one embodiment. Display page 200 includes a callee identification area 201 and a context area 202. The callee identification area identifies the callee by name and telephone number. The context area lists the context that was automatically collected by the context system. The automatically collected context includes a priority 203 that may default to medium, a subject 204 that is derived from the subject of the electronic mail message, and an identification 205 of the electronic mail message that may include the sender, the recipient, the subject, and the received time. The content of the identified electronic mail message may be included in the context. The display page also includes a place call with context button 206, a place call without context button 207, and a change context button 208. The caller selects the place call with context button to place the call with the identified context. The caller selects the place call without context button to place a call without sending any context. The caller selects a change context button to modify the context before placing a call.

Figure 3:
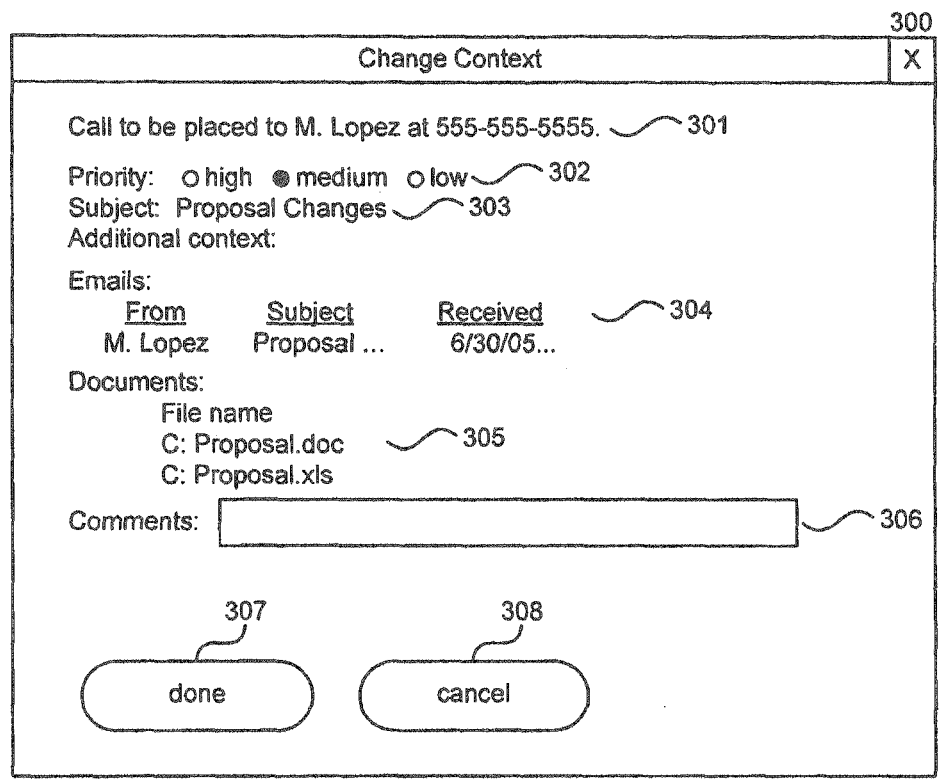
FIG. 3 is a display page that illustrates the changing of context collected by the context system in one embodiment.

FIG. 3 is a display page that illustrates the changing of context collected by the context system in one embodiment. Display page 300 includes a callee identification area 301, a priority area 302, a subject area 303, an electronic mail context area 304, a documents context area 305, a comments area 306, a done button 307, and a cancel button 308. The callee identification area identifies the callee by name and telephone number. The priority area contains radio buttons for establishing the priority of the call. The subject area contains the subject associated with the call, which may be modified by the caller before the call is placed. The electronic mail context area and the documents context area list the electronic mail messages and documents that are currently included in the context of the call. The caller may delete or add messages and documents. The caller may add comments to the context via the comments area.

Figure 4:
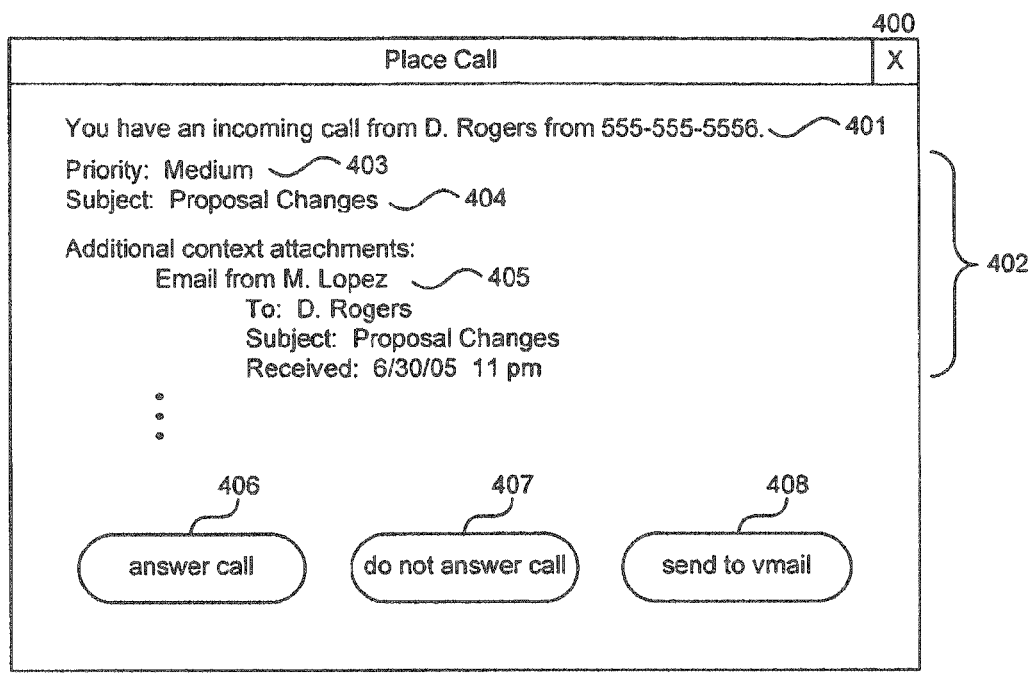
FIG. 4 is a display page that illustrates notifying a callee when a call that includes context has been received in one embodiment.

FIG. 4 is a display page that illustrates notifying a callee when a call that includes context has been received in one embodiment. Display page 400 includes a caller identification area 401 and context area 402. The caller identification area identifies the caller by name and calling telephone number. The context area includes a priority area 403, a subject area 404, and an additional context area 405. The context corresponds to the electronic mail message that the caller selected when indicating to place a telephone call. The display page also includes an answer call button 406, a do not answer call button 407, and a send to voice mail button 408. The caller selects the answer call button to answer the telephone call. The caller selects the do not answer call button to indicate that the call should not be answered. The caller selects the send to voice mail button to send the call to voice mail.

Figure 5:
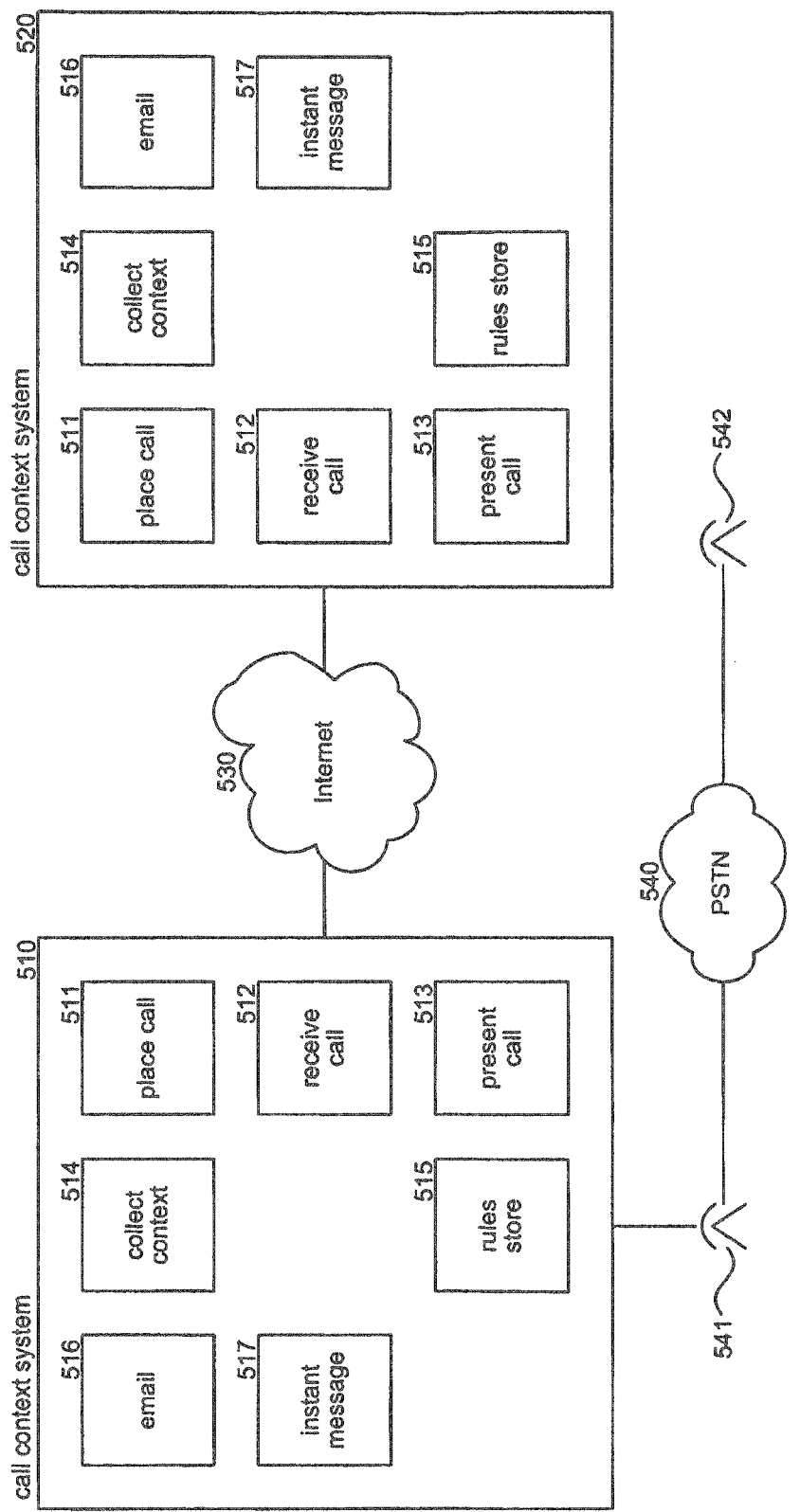
FIG. 5 is a block diagram that illustrates components of the context system in one embodiment.

FIG. 5 is a block diagram that illustrates components of the context system in one embodiment. The context system may be used to provide context associated with various types of calls such as instant messaging, telephone calls using Voice over IP ("VoIP") or the PSTN, video calls, conference calls, and so on. The context systems implemented on devices 510 and 520 include a place call component 511, a receive call component 512, a present call component 513, a collect context component 514, and a rules store 515. A context system may also interface with an electronic mail program 516 and an instant message program 517. When a caller wants to place a call in the context of an application, the application invokes the place call component, which in turn invokes the collect context component to collect some context automatically from the application and allow the user to modify the context. The place call component then initiates the call such as by sending to the callee device a SIP INVITE request requesting to initiate a VoIP call and including the context. When the callee device receives the request, it invokes the receive call component. The receive call component may apply various rules of the rules store specified by the callee to determine how to handle the call. If the rules indicate that the call should be presented to the callee, then the receive call component invokes the present call component to present the call to the callee to give the callee the option to answer the telephone call. A callee may specify a rule that indicates that under certain conditions a call should be automatically answered without presenting it to the callee first. The caller device and the callee devices may be interconnected via the Internet 530. In addition, a telephone call may be placed using PSTN 540 from the caller telephone 541 to the callee telephone 542. In such a case, the context system of the caller device may send the context associated with the telephone call via the Internet to the callee device so that it arrives at the callee device before the telephone is answered by the callee.

The devices on which the context system is implemented may include a central processing unit, memory, input devices (e.g., keyboard and pointing devices), output devices (e.g., display devices), and storage devices (e.g., disk drives). The memory and storage devices are computer-readable media that may contain instructions that implement the context system. In addition, the data structures and message structures may be stored or transmitted via a data transmission medium, such as a signal on a communications link. Various communications links may be used, such as the Internet, a local area network, a wide area network, or a point-to-point dial-up connection.

The context system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The context system may be implemented on computing devices that include personal digital assistants ("PDAs"), cell phones, consumer electronic devices (e.g., audio playback devices), game devices, telephones, and so on.

The context system may be described in the general context of computer-executable instructions, such as program modules, executed by one or more computers or other devices. Generally, program modules include routines, programs, objects, components, data structures, and so on that perform particular tasks or implement particular abstract data types.

Typically, the functionality of the program modules may be combined or distributed as desired in various embodiments.

Figure 6:
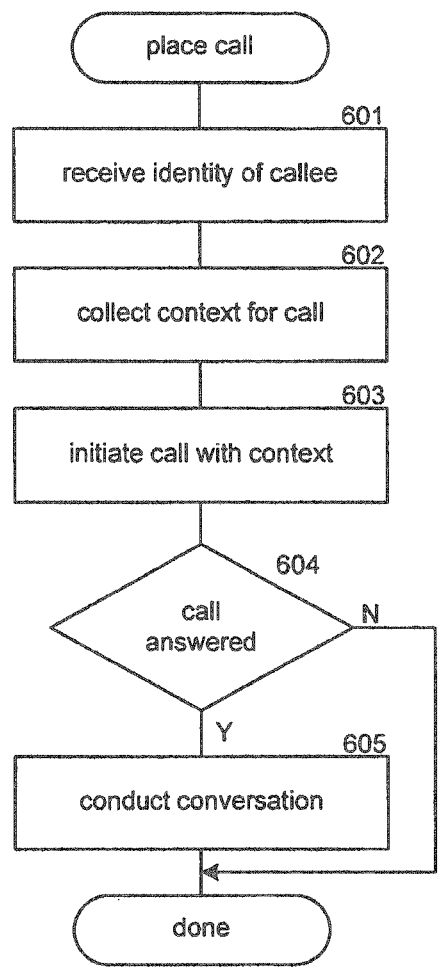
FIG. 6 is a flow diagram that illustrates the processing of the place call component in one embodiment.

FIG. 6 is a flow diagram that illustrates the processing of the place call component in one embodiment. The place call component is invoked when a caller indicates that a call is to be placed to a callee. In block 601, the component receives the identity of the callee. For example, the component may derive the identity of the callee from the currently selected electronic mail message or from the currently selected contact of an instant messaging contact list. In block 602, the component collects the context for the call. For example, the context may be the currently selected electronic mail message or a document currently opened by a word processing system. The component may allow the caller to remove or modify the context. In block 603, the component initiates the call with the callee and sends the context to the callee. In decision block 604, if the call is answered by the callee, then the component allows the conversation to be conducted in block 605, else the component completes when the caller indicates to hang up.

Figure 7:
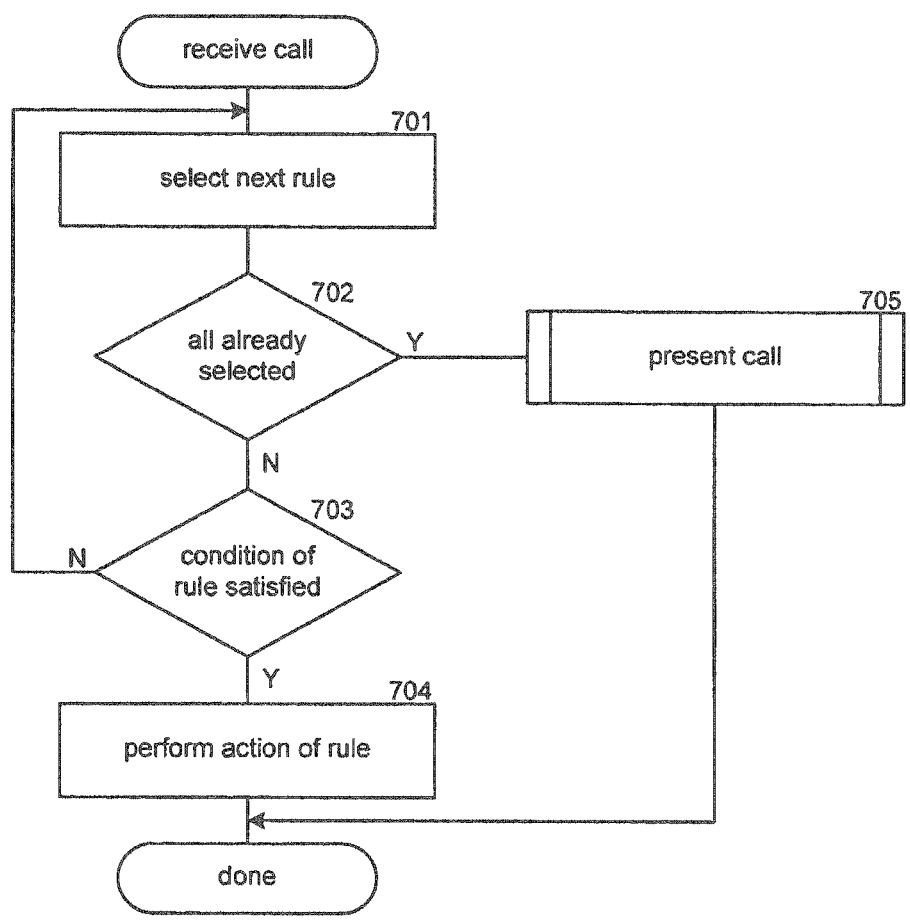
FIG. 7 is a flow diagram that illustrates the processing of the receive call component in one embodiment.

FIG. 7 is a flow diagram that illustrates the processing of the receive call component in one embodiment. The component is invoked when a call is received at a callee device. The component handles the call in accordance with rules specified by the callee. In block 701, the component selects the next rule specified by the callee. In decision block 702, if all the rules have already been selected, then the component continues at block 705, else the component continues at block 703. In decision block 703, if the condition of the selected rule is satisfied by the context or the caller ID information of the call, then the component continues in block 704, else the component loops to block 701 to select the next rule. In block 704, the component performs the action of the rule and then completes. Alternatively, the component may continue processing the rules after the action is performed. In block 705, the component performs the default action if none of the rules apply. In this example, a default action is to invoke the present call component to present the call to the callee.

Figure 8:
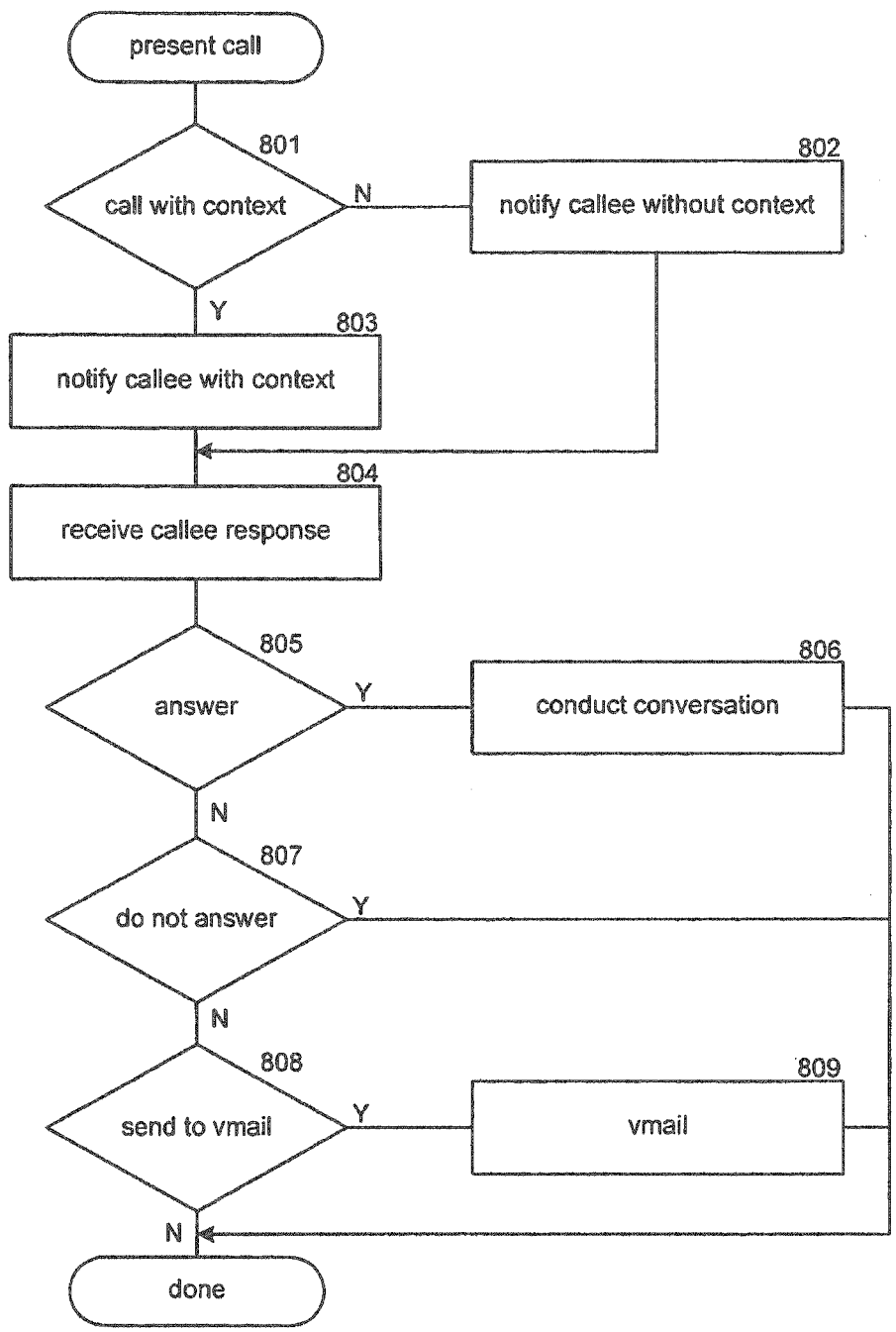
FIG. 8 is a flow diagram that illustrates the processing of the present call component in one embodiment.

FIG. 8 is a flow diagram that illustrates the processing of the present call component in one embodiment. The component is invoked to present a call to the callee. In decision block 801, if the call includes context, then the component continues at block 803, else the component continues at block 802. In block 802, the component notifies the callee of the call without providing any context. In block 803, the component notifies the callee of the call and provides the context. In block 804, the component receives the response from the callee. The response may be to answer the call, not answer the call, send the call to voice mail, and so on. In decision block 805, if the response indicates to answer the call, then the component conducts the conversation in block 806 and then completes, else the component continues at block 807. In decision block 807, if the response is to not answer the call, then the component completes, else the component continues at block 808. In decision block 808, if the response is to send the call to voice mail, then the component sends the call to voice mail in block 809. The component then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

From the foregoing, it will be appreciated that specific embodiments of the context system have been described herein for purposes of illustration, but that various modifications may be made without deviating from the spirit and scope of the invention. Accordingly, the invention is not limited except as by the appended claims.

We claim:

1. A computer-readable memory storing instructions of a context system for controlling a device of a caller to provide context for a call, the instructions comprising:
    instructions that receive from the caller an indication of a callee to whom a call is to be placed;
    instructions that, after receiving the indication of the callee to whom the call is to be placed, automatically collect from an executing application that is not part of the context system context for the call to be placed to the callee; and
    instructions that send from the device of the caller to the callee a message indicating that the caller is placing a call to the callee, the message including the automatically collected context for presenting to the callee before the call is answered.

2. The computer-readable memory of claim 1 wherein the instructions further comprise instructions that associate digital rights management with the context to control access to context that is included in the message.

3. The computer-readable memory of claim 1 wherein the instructions further comprise instructions that associate digital right management with the call to control access to the call.

4. The computer-readable memory of claim 1 wherein the instructions further comprise instructions that allow the caller to review and modify the automatically collected context before sending the message.

5. The computer-readable memory of claim 1 wherein the executing application is a web browser and the automatically collected context includes a link to a web page currently opened by the web browser.

6. The computer-readable memory of claim 1 wherein the instructions further comprise instructions that convert the context to a format appropriate for the callee.

7. The computer-readable memory of claim 1 wherein the instructions further comprise instructions that convert the context from a text format to a speech format.

8. The computer-readable memory of claim 1 wherein the instructions that send the message include instructions to send a session initiation protocol ("SIP") invitation indicating that context extensions are supported.

9. The computer-readable memory of claim 1 wherein the instructions further comprise instructions that save context with a voice mail of a call.

10. A device for providing context for a call, the device comprising:
    a memory storing computer-executable instructions of a context system that includes:
        a component that receives from a caller an indication of a callee to whom a call is to be placed;
        a component that collects from an executing application context for the call, the executing application being external to the context system; and
        a component that sends from the device of the caller to the callee a message indicating that the caller is placing a call to the callee, the message including the collected context for presenting to the callee before the call is answered; and
    a processor for executing the computer-executable instructions stored in the memory.

11. The device of claim 10 wherein the memory further stores instructions of a component that associates digital rights management with the context to control access to context that is included in the message.

12. The device of claim 10 wherein the memory further stores instructions of a component that allows the caller to review and modify the collected context before sending the message.

13. The device of claim 10 wherein the memory further stores instructions of a component that collects context from multiple executing applications and wherein the message includes the context collected from the multiple executing applications.

14. The device of claim 10 wherein the memory further stores instructions of a component that converts the context to a format appropriate for the callee.

15. The device of claim 10 wherein the component that sends the message sends a session initiation protocol ("SIP") invitation indicating that context extensions are supported.

16. A method performed by a device of a caller executing a context system for providing context for a call prior to the call being answered, the method comprising:
receiving from the caller an indication that a call is to be placed;
after receiving the indication that the call is to be placed, automatically collecting from an application context for the call to be placed, the application not being part of the context system; and
sending from the device of the caller to a callee a message indicating that the caller is placing a call to the callee, the message including the automatically collected context for presenting to the callee before the call is answered.

17. The method of claim 16 further comprising associating digital rights management with the context to restrict actions the callee can take with context that is included in the message.

18. The method of claim 16 further comprising allowing the caller to review and modify the collected context before sending the message.

19. The method of claim 18 further comprising converting the context to a format appropriate for the callee.

20. The method of claim 19 further comprising sending a session initiation protocol ("SIP") invitation indicating that context extensions are supported by the caller.

* * * * *